Patented Dec. 19, 1950

2,534,246

UNITED STATES PATENT OFFICE 2,534,246

8-HALOXANTHINE SALTS OF N,N-DIALKYL-N'-ARYLMETHYL- N'- PYRIMIDYL-ALKYL-ENEDIAMINES AND PROCESS FOR PREPARING SAME

John W. Cusic, Skokie, Ill., assignor to G. D. Searle & Co., Chicago, Ill., a corporation of Illinois No Drawing. Application January 21, 1950, Serial No. 139,969

12 Claims. (Cl. 260—253)

This invention relates to salts of N,N-dialkyl-N' - arylmethyl - N' - pyrimidylalkylenediamines with 8-haloxanthines which contain a hydrogen atom in position 7, and to the production thereof. More particularly this invention relates to salts of organic bases of the general formula

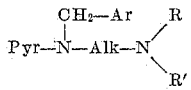

wherein Pyr is a pyrimidyl radical, Ar is an aryl radical, Alk is a lower alkylene radical and R and R' are lower alkyl radicals, with 8-haloxanthines which contain a hydrogen atom in the 7 position.

This application is a continuation-in-part of my prior applications Serial No. 745,630, filed May 2, 1947, now abandoned, and Serial No. 71,763, filed January 19, 1949.

In the foregoing formula, Pyr represents a pyrimidyl radical, preferably a 2-pyrimidyl radical. Ar represents a monocarbocyclic aromatic radical and includes phenyl, p-chlorophenyl, p - bromophenyl, p - methoxyphenyl, p - ethoxyphenyl, o-methoxyphenyl, 2,4-dimethoxyphenyl, 2,4-dichlorophenyl and related radicals of the benzene series. Alk represents a bivalent saturated aliphatic hydrocarbon radical containing at least two and not more than five carbon atoms. It includes alkylene radicals such as ethylene, propylene, butylene, trimethylene, and amylene. R and R' are lower alkyl radicals containing not more than eight carbon atoms, and include methyl, ethyl, propyl, isopropyl, butyl, isobutyl, amyl, hexyl, heptyl and octyl radicals.

It is recognized that organic bases of the foregoing structural formula, which are widely used as antihistaminic drugs, elicit certain undesirable side reactions and toxic manifestations, the most common of which are drowsiness and dizziness. It is the object of this invention to produce new therapeutic substances which are relatively free from such untoward reactions. Another object is to produce salts of antihistaminic agents and haloxanthines which have reduced toxicity. A further object is to produce such salts having enhanced therapeutic efficacy. Other objects will be apparent to those skilled in the art in view of the disclosure given herein.

I have discovered that salts of organic bases of the foregoing formula with haloxanthines produce little effect on the central nervous system and appear to be more useful therapeutically than any of the individual components alone. Such salts exert a potentiating effect and show enhanced activity in combatting the effects of histamine. They are particularly useful in the treatment of anaphylaxis and allergic disorders. Certain of the salts within the scope of this invention are so free from undesirable side effects that may be used in the treatment and prevention of motion sickness.

Among the halogenated xanthines to which this invention pertains are the chloro, bromo, and iodo derivatives of theophylline and related xanthines which have a hydrogen atom in position 7.

In particular this invention is concerned with acidic xanthines such as 8-chlorotheophylline
8-bromotheophylline
8-chloroxanthine
3-methyl-8-chloroxanthine
8-bromoxanthine
3-methyl-8-bromoxanthine
1,3-diethyl-8-bromoxanthine
1,3-diethyl-8-chloroxanthine
8-iodotheophylline
8-iodo-1,3-diethylxanthine Compositions of organic bases and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the organic bases are desirable in these synthetic procedures. The desired salt generally crystallizes out of the solution on chilling or standing, or may be precipitated by addition of a solvent such as ether or benzene.

The following examples illustrate in more detail my invention, but in no way are to be construed as limiting it in spirit or in scope.

Example 1

100 parts of N,N-dimethyl-N'(p-methoxybenzyl)-N'-(2-pyrimidyl)ethylenediamine, which has the formula

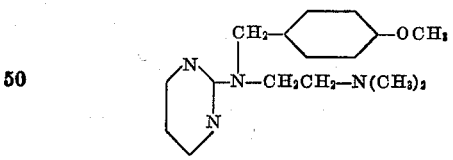

and 70 parts of 8-chlorotheophylline are dissolved in a boiling mixture of 400 parts of methyl ethyl ketone and 100 parts of water. The hot solution is filtered and evaporated under vacuum. There is thus obtained the 8-chlorotheophylline salt of N,N - dimethyl - N' - (p-methoxybenzyl)-N'(2-pyrimidyl)ethylenediamine as a glassy solid. A sample of this salt on analysis showed 6.72% chlorine and 2.40% basic nitrogen. The calculated values are 7.08% and 2.80% respectively.

*Example 2*

15 parts of N,N-dimethyl-N'-benzyl-N'-(2-pyrimidyl)ethylenediamine, which has the formula

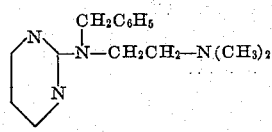

and 11 parts of 8-chlorotheophylline are dissolved in 60 parts of boiling methyl ethyl ketone containing 10 parts of water. The hot solution is filtered and evaporated at 100° C. under vacuum. There is formed a noncrystalline residue of the 8-chlorotheophylline salt of N,N-dimethyl - N' - benzyl - N' - (2 - pyrimidyl)ethylenediamine. A sample on analysis showed 7.32% chlorine. The calculated value is 7.54%.

*Example 3*

30 parts of N,N-dimethyl-N'-(p-methoxybenzyl)-N'-(2-pyrimidyl)ethylenediamine and 24 parts of 8-bromotheophylline are dissolved in 125 parts of boiling methyl ethyl ketone containing 20 parts of hot water. The boiling solution is filtered and then evaporated at 100° C. under vacuum to about one half its volume. The residual solution is chilled and diluted with ether. The precipitate of the 8-bromotheophylline salt of N,N-dimethyl-N'-(p-methoxybenzyl)-N'-(2-pyrimidyl)ethylenediamine is triturated with ether and dried in vacuum. A sample on analysis showed 14.34% bromine. The calculated value is 14.62%.

I claim:

1. A salt of an organic base of the formula

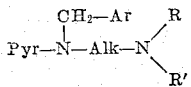

wherein Pyr is a pyrimidyl radical, Ar is a monocarbocyclic aromatic radical, Alk is a lower alkylene radical and R and R' are lower alkyl radicals, with an 8-haloxanthine which contains a hydrogen atom in position 7.

2. An 8-halotheophylline salt of an organic base as defined in claim 1.

3. An 8-halotheophylline salt of an N,N-di(lower alkyl)-N'-(monocarbocyclic aryl)methyl-N'-(2-pyrimidyl)ethylenediamine.

4. An 8-halotheophylline salt of an N,N-dimethyl-N'-(monocarbocyclic aryl)methyl-N'-(2-pyrimidyl)ethylenediamine.

5. An 8-halotheophylline salt of N,N-dimethyl-N'-benzyl-N'-(2-pyrimidyl)ethylenediamine.

6. The 8-chlorotheophylline salt of N,N-dimethyl - N' - benzyl - N' - (2 - pyrimidyl)ethylenediamine.

7. An 8-halotheophylline salt of N,N-dimethyl-N' - (p - methoxybenzyl) - N' - (2 - pyrimidyl)-ethylenediamine.

8. The 8-chlorotheophylline salt of N,N-dimethyl - N' - (p - methoxybenzyl) - N' - (2 - pyrimidyl)ethylenediamine.

9. The 8-bromotheophylline salt of N,N-dimethyl - N' - (p - methoxybenzyl) - N' - (2 - pyrimidyl)ethylenediamine.

10. The process of producing an 8-haloxanthine salt of an organic base as defined in claim 1 which comprises reacting an 8-haloxanthine which contains a hydrogen atom in position 7 with at least one equivalent of the aforesaid organic base in a hot, inert, water-miscible organic solvent, and separating the salt thus formed.

11. The process of producing an 8-halotheophylline salt of an N,N-di(lower alkyl)-N'-(monocarbocyclic aryl)-methyl-N'-(2-pyrimidyl)ethylenediamine which comprises reacting an 8-halotheophylline with at least one equivalent of the aforesaid organic base in a hot, inert, water-miscible organic solvent, and separating the salt thus formed.

12. The process of producing the 8-chlorotheophylline salt of N,N-dimethyl-N'-(p-methoxybenzyl) - N' - (2 - pyrimidyl)ethylenediamine which comprises reacting 8-chlorotheophylline with at least one equivalent of the aforesaid organic base in hot methyl ethyl ketone, and separating the salt thus formed.

JOHN W. CUSIC.

No references cited.